United States Patent [19]

Schöniger et al.

[11] Patent Number: 5,027,258
[45] Date of Patent: Jun. 25, 1991

[54] DISPLAY UNIT

[75] Inventors: Karl-Heinz Schöniger, Esslingen; Winfried Scheid, Ebersbach, both of Fed. Rep. of Germany

[73] Assignee: Inotec GmbH Gesellschaft für Innovative Technik, Esslingen, Fed. Rep. of Germany

[21] Appl. No.: 518,989

[22] Filed: May 4, 1990

[30] Foreign Application Priority Data

Jun. 19, 1989 [DE] Fed. Rep. of Germany ....... 3919925

[51] Int. Cl.$^5$ .............................................. F21V 7/04
[52] U.S. Cl. .................................... 362/31; 362/812; 362/800; 40/547
[58] Field of Search ................... 362/31, 84, 330, 800, 362/812, 32; 40/204, 205, 546, 547

[56] References Cited

U.S. PATENT DOCUMENTS

| 2,095,558 | 10/1937 | Oberaeker | 362/812 X |
| 2,551,622 | 5/1951 | Mohr | 362/26 X |
| 2,623,313 | 12/1952 | Fuchs | 362/812 X |
| 4,385,343 | 5/1983 | Plumly | 362/31 |
| 4,573,766 | 3/1986 | Bournay, Jr. et al. | 362/31 X |
| 4,799,133 | 1/1989 | Strzalko et al. | 362/31 X |
| 4,807,378 | 2/1989 | Bell | 362/812 X |
| 4,918,578 | 4/1990 | Thompson | 362/31 |

Primary Examiner—Stephen F. Husar
Assistant Examiner—Peggy A. Neils
Attorney, Agent, or Firm—McGlew & Tuttle

[57] ABSTRACT

An illuminated display unit such as a board with a house number thereon or an advertising billboard, has a light guide panel. At least one electrical illuminating element is arranged in the vicinity of at least one lateral limiting edge thereof. The light guide panel serves for illuminating logo symbols, which are preferably in the form of film or of vapor coated layers, on the light guide panel. At least one of the lateral limiting edges of the light guide panel is provided with a light guide batten whose thickness is in excess of the thickness of the light guide panel and at least one of the illuminating elements is mounted in the batten. The transition between the light guide batten and the light guide panel is designed so as to have a high optical conductivity or transmittivity. The external surfaces of the light guide batten are provided at least partly with an inwardly reflecting layer. This makes it possible for the light of the illuminating elements, which are more especially in the form of LED's with a large diameter, to be fully introduced in substantially thinner light guide panels in order to reduce costs and weight.

20 Claims, 2 Drawing Sheets

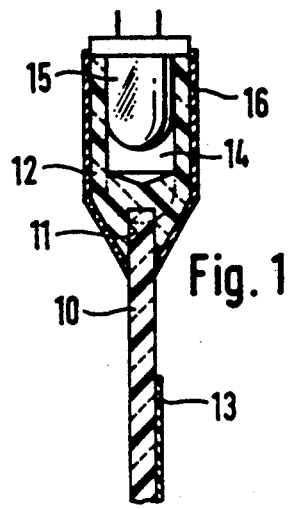

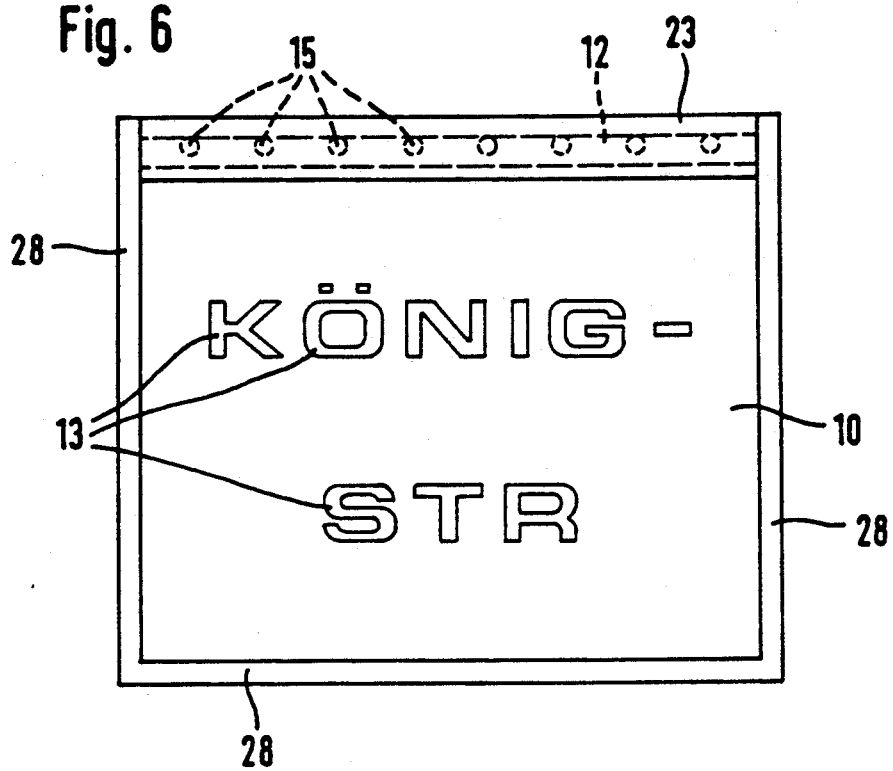
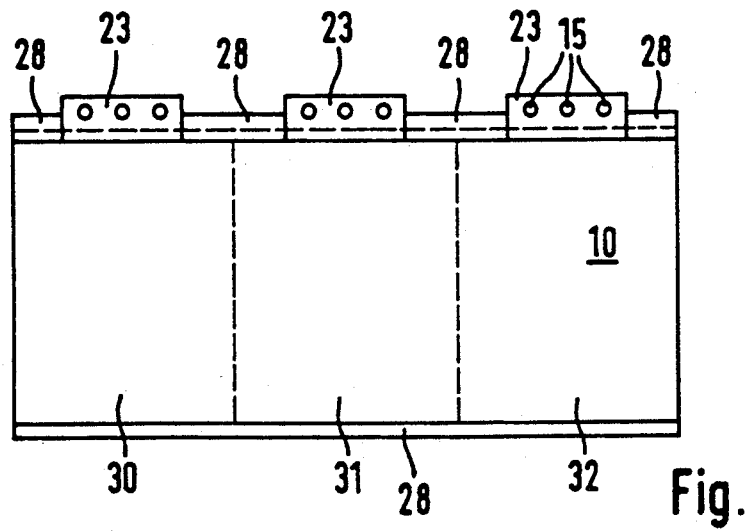

DISPLAY UNIT

BACKGROUND OF THE INVENTION

The invention relates to a display unit, such as a house number display, a traffic sign, or an advertising display unit, consisting of a light guide panel with at least one electrical illuminating element arranged in the vicinity of at least one lateral edge limit and with symbols to be illuminated by the light guide panel.

In the case of such a display unit as described in the German specification No. 3,825,436 LED's were proposed as illuminating elements which were placed in marginal holes with a suitable diameter in the light guide panel. In such a unit the light of the illuminating elements directed into the light guide panel is generally only able to leave the light guide panel at contact points or cut edges, since in other parts there is an essentially total reflection at the lateral faces. For this reason all lateral limiting edges are provided with a reflecting coating, which reflects the light at this position back into the panel. Thus, exit of the light is only able to take place at the position at which the display symbols are mounted. It is in this manner that it is possible to ensure a high light yield or efficient use of the light so that large panels as well may be used without requiring very much energy, energy such as electrical energy, or they may even be operated with solar energy.

The disadvantage of this known design is that the LED's generally have a diameter of 5 mm, and there are also other LED's with a diameter of 8 and 10 mm. More particularly in the case of light guide panels with very large dimensions there is a desire to use LED's with larger diameters for more light. In this known display unit it is therefore necessary for the thickness of the light guide panel to be made suitably large so that light guide panels with a thickness of 8 to 14 mm are necessary, which are provided with holes of a suitable diameter so that large LED's may be mounted therein. Since however it is specifically large light guide panels which call for LED's with large diameters, such light guide panels are very heavy and expensive. A further factor is that mass produced fluorescent light guide panels are generally only obtainable with a thickness of 3 mm so that expensive customized products are required which are subject to minimum orders.

SHORT SUMMARY OF THE INVENTION

One object of the present invention is the creation of a display unit with illumination means of the initially described type, which in order to reduce costs and weight may be made with a very thin light guide panel.

A still further aim of the invention is to provide such a display unit in which the light of illuminating elements may be introduced into the panel with a low loss, even if the illuminating elements have a substantially larger diameter.

In order to achieve these or other objects appearing in the instant specification, claims and drawings, at least one zone of one of the lateral limiting edges of the light guide panel is provided with a light guide batten which is thicker than the light guide panel and in which at least one illuminating element is mounted, and the transition between the light guide batten and the light guide panel is produced so as to have a high optical conductivity and the external surfaces of the light guide batten are at least in part provided with an internally reflecting layer.

The advantages of such an arrangement are that there is flexibility in regards to the use of LED's whose diameter no longer has to be in accordance with the thickness of the light guide panel. In consequence there is in principle no lower limit for the thickness of the light guide panels and even films or foils may be used, it only being necessary for the light guide batten to have a thickness with a size greater than the diameter of the illuminating elements such as illuminating LED's, which are preferably used as illuminating elements. Furthermore, it is possible for very large units, as for example for advertising purposes, to be thus produced with a low weight and using panels of conventional thickness. Owing to the high optical conductivity of the transition between the light guide batten and the light guide panel, the light from the illuminating element or elements may be introduced into the light guide panel with hardly any losses, as if the illuminating element or elements are mounted directly in the light guide panel. The reflecting layer on the outer surfaces of the light guide batten then prevents any undesired loss of light at this position from the panel and ensures an improvement in the efficiency.

Further developments of the invention are recited in the dependent claims.

In the simplest case the light guide batten has at least one groove in order to receive an edge zone of the light guide panel. The light guide can to be produced in a simple manner by an extruding operation in the form of running lengths. However, the light guide batten may also be in the form of essentially two strip-like batten elements respectively arranged laterally on one edge zone of the light guide panel and which may end flush with the light guide panel or may project past its edge zone. The holes for receiving the LED's may then extend into the light guide panel.

In order to obtain a high optical conductivity between the light guide batten and the light guide panel the same are bonded or welded together, such welding being more preferably done by a high frequency welding method. In the case of bonding an adhesive with a good optical conductivity is to be used.

The light guide panel may however also be jammed or interference-fitted in the groove in the light guide batten, and in this case the surfaces of the interference joint which abut each other may be provided with a paste or a liquid having a high optical conductivity.

In all these cases of bonding, welding, and interference fitting using a light conductor paste or a liquid a light transition is produced, which hardly has any optical effect, i.e. it is as if the light guide batten and the light guide panel were made integrally. However, it is naturally also possible for these parts to be made in one piece.

In order to produce a display unit whose display symbols are to be seen from either side, the light guide batten preferably has two grooves in order to receive the edge zones of two light guide panels, there preferably being a further groove between such grooves in order to receive the edge zone of a contrast panel. The opaque contrast panel then arranged between these light guide panels then serves for use with the two light guide panels. Then the illuminating elements mounted in this light guide batten may be used for illuminating both the panels, on whose back side the same or different logos may be arranged, this being a further advantage of the invention.

In order to secure two light guide panels, which are arranged in mutual parallelism and have at least one light guide batten in one zone, on two light guide battens placed alongside each other, together with outer covering panels of thin material for protection of the light guide panels, it is preferred to use a holding frame fitting at least partly around the light guide panels, which in addition also holds the cover panels parallel to each other and at the desired distance. It is in this manner that a single frame may hold the entire arrangement in the desired order and in place.

In order to fix this arrangement at one point at least clear of the light guide battens, there is a holding frame at this position, which has grooves for receiving the edge zones of the light guide panel, a contrast panel being arranged between the same and the edge zones of two cover panels at the two outer sides.

In order to simplify and cheapen production the holding frames preferably consist of a plastic material, a depression running through on the outside being provided in order to receive a metallic reinforcing batten.

The illuminating elements in the form of LED's may more especially be in different colors as required for advertising purposes so that by switching the elements on and off or dimming them it is possible to produce a large number of different colors and hues by mixing effects. It is also possible to associate different light guide battens with different parts of the light guide panel, such light guide battens however respectively having a plurality of differently colored illuminating elements. As a result it is then possible to illuminate these different zones of the light guide panel in different variations in different colors, it also being possible to consider providing dynamic lighting effects or the like.

In order to minimize light losses, all edge zones of the light guide panel outside the zones having light guide battens are provided with a reflecting coating, which may either be a film or a vapor deposited layer.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 shows a cross section of a first working embodiment of the invention with a light guide panel mounted in a light guide batten.

FIG. 2 shows a similar design with two light guide panels, mounted in a light guide batten as a second embodiment of the invention.

FIG. 3 shows a third embodiment the invention in the form of a light guide batten, which consists of two strip-like batten elements.

FIG. 4 shows a design like that of FIG. 3 as a fourth working embodiment of the invention in which an LED extends into a position within the light guide.

FIG. 5 shows an arrangement with two light guide panels in accordance with a first working example in a holding frame.

FIG. 6 is a front elevation of a display unit with a light guide batten on the upper edge of the light guide panel.

FIG. 7 shows an arrangement of three separate light guide battens on the upper edge of a light guide panel divided up into three zones.

DETAILED DESCRIPTION OF THE WORKING EMBODIMENTS OF THE INVENTION

In the case of the first working embodiment of the invention depicted in FIG. 1 a light guide panel 10, which is only partly shown in cross section and is made of transparent material, is set in the groove 11 in a light guide batten 12, which also consists of transparent material. The transparent material may in the simplest case be a glass-clear resin such as acrylic glass, in which respect however fluorescent materials are much more suited. Such material consist of glass-clear resin, which is colored with a fluorescent dye or has fluorescent particles mixed with it. Such light guide panels have the property of radiating absorbed light owing to fluorescence. The radiation due to fluorescence is shone towards the limiting edges by total reflection, where it is radiated out of the panel in a concentrated manner, if such tendency to be radiated is not neutralized by special measures. Furthermore there is an exit of light at those points at which other structures are in close contact with the light guide panel. In the present case such light exit is caused by logo symbols 13, which are arranged on the rear face, i.e. the face furthest from the observer, of the light guide panel 10. These logo symbols 13 may be in the form of adhesively attached film, vapor coatings or the like. At the contact faces there is an exit of the light so that it illuminates the applied advertising symbols 13. As a matter of principle it is also to have logo symbols molded in the panel or more especially milled the same, so that the light leaves the panel at the milled surface and illuminates it. Lastly it is principle possible to arrange opaque logo symbols on the front face of the panel, which then make a contrast with the light in the light guide panel.

Furthermore, both the light guide panel 10 and also the light guide batten 12 may as a matter of principle be made of a fluorescent material, but it is often sufficient if the light guide batten 12 is made of ordinary, transparent resin. In accordance with a particularly simple and economic design it is naturally also possible for the light guide panel 10 as well to be made of palin, transparent resin.

The light guide batten 12 is made thicker than the light guide panel 10 and possesses an essentially rectangular cross section, there being oblique surfaces directed towards the light guide panel 10 in the vicinity of the groove 11. These surfaces may naturally also be round or have another form or such special configuration may be omitted completely. Finally, it is also possible for the light guide batten 12 as well to have a different form of cross section, as for example a triangular cross section.

The connection of the light guide panel 10 set in the groove 11 is by bonding using an adhesive with a high transparency, that is to say with a high conductivity for light, or a weld may be used which is produced for example by high frequency welding. As an alternative to this it is possible for the light guide panel 10 to also be clamped or pressed into the groove 11, the contacting surfaces then being provided with a paste or a liquid which is a good conductor of light. The purpose of these measures is to ensure passage of the light from the light guide batten to the light guide panel 10 with the least possible hindrance and with the best possibility of homogeneous transmission of the light and in order to emulate an integral structure as far as possible, such integral or one-piece structure also obviously being possible as well if desired.

A blind hole 14 extends from the top face of the light guide panel 12 into the interior of the light guide batten 12 towards the light guide panel 10. This blind hole 14 may come to an end short of the light guide panel 10 but it may however also extend into the light guide panel 10, as is in fact indicated in broken lines. This blind hole 14 receives an LED 15, whose external diameter is essentially identical to the diameter of the blind hole 14. This LED 15 may—as is in fact illustrated—end short of the lower end of the blind hole 14, but may however extend as far as the end. In the cross sectional view of FIG. 1 the reader will see only one LED 15, but it is clear that a greater number of LED's may be provided with a regular or with an irregular distance between them, as is indicated in more detail in FIGS. 6 and 7.

The external surfaces of the light guide batten 12 are provided with an inwardly reflecting layer 16 but for the part with the groove 11. In this respect it may be a question of an internally mirror coated film, but this layer 16 can also be a mirror layer applied by vapor coating or in some other convenient manner. The upper surface of the light guide batten 12 is naturally also provided with this layer 16, but this can not be indicated in the sectional view owing to the inserted LED 15. In a particular case it is obviously possible to dispense with the mirror coating on a certain surface or of a surface range, but however the largest possible area of the light guide batten 12 should be provided with such a layer 16, more particularly the cut and oblique faces in order to prevent the exit of light. As a result all of the light from the LED 15 is able to pass to the light guide panel 10.

Furthermore as a matter of principle in place of the LED's 15 it would be possible to use other small light producing devices.

This arrangement it is possible for very thin light guide panels 10 with a thickness of 3 mm to be supplied with light by very large LED's 15 with a larger light output such as ones with a diameter of 5, 8 or even 10 mm in order to reduce the costs and the weight of the display unit.

Dependent on the size of the light guide panel 10 it is possible for such a light guide batten 12 to be arranged on one side edge of the light guide panel 10, while the other side edges are provided with a suitable reflecting layer 16. It is possible however as well for such light guide battens 12 to be provided at all edges of the light guide panel 10.

In the case of the second working embodiment of the invention depicted in FIG. 2 two light guide panels 10 are set in a parallel manner in the suitable grooves 11 of a broader light guide batten 12. Between these grooves 11 there is a further groove 18 in order to receive a contrast panel 19. The contrast panel 19 being arranged between the light guide panels 10. This makes it possible to create a display unit, whose symbols 13 may be read from either side thereof. For this purpose these display symbols 13 are respectively placed on the side facing of the contrast panel 19 of the light guide panel 10. It would obviously furthermore be possible to have different display symbols or logos 13. Such a contrast panel 19 may naturally also be provided in the first and the subsequent embodiments of the invention in order to achieve contrast between the illuminated logo symbols 13 and the background.

The light guide batten 17 is again provided with a reflecting layer 16, the LED 15 now being able to supply the two light guide panels 10 with light. This light guide batten 17 thus not only serves to transfer light from the large LED 15 to the thin light guide panels 10 but also to hold the panels.

In the third and fourth working embodiments of the invention depicted in FIGS. 3 and 4 a light guide batten 20 respectively consists of two strip-like batten elements 21, which are secured to the two side faces of the light guide panel 10 at the marginal portion thereof, more particularly by bonding or welding. In this third working example of the invention as shown in FIG. 3 these batten elements 21 project past the light guide panel 10, while in the working example in accordance with FIG. 4 they end flush with the upper edge of the light guide panel 10. Here as well there is from the optical point of view a connection with a high conductivity in the form of a weld or a bond with an optically homogeneous extension of the light guide panel 10. The blind hole 14 in accordance with the third working embodiment of the invention extends in the vicinity of a slot 22, which is formed in the projecting zone of the batten elements 21, whereas in the fourth working example as shown in FIG. 4 the blind hole 14 extends into the batten elements 21 and the light guide panel 10.

In the arrangement shown in FIG. 5 two light guide panels 10, which are provided with light guide battens 12 in accordance with the first working embodiment, are held by an essentially U-like holding frame 23 of resin. A contrast panel 24 is held between the two light guide battens 12. Between the opposite outer faces of the light guide battens 12 and the inner sides of the limbs, of the holding frame 23, cover plates 25 of transparent resin material or glass fitting over the light guide battens 12, are provided in order to protect the light guide panels 10. In the vicinity of the LED's 15 the holding frame 23 has a channel 26 in order to accommodate the connections and leads for the LED's 15. On the upper connection zone of the U-like holding frame 23 there is a recess in order to receive a metallic tape 27 which is preferably made of aluminum. This metallic tape 27 serves to reinforce the holding frame 23. If the latter is itself made of a stiffer material or of a metal, then it is naturally possible to dispense with this metallic tape.

On the opposite edges of the light guide panels 10, of the contrast panel 24 and of the cover panels 25 there is a holding frame 28, which has five grooves 29 in order to receive the panels 10, 24 and 25 with the desired, design spacing. This holding frame 28 also has a corresponding channel and a metallic tape 27 for reinforcement. The zones adjacent to the sides of the light guide panels 10 opposite to the light guide battens 12 are provided with the reflecting layer 16.

It would obviously be possible to have two holding frames 23 for example on opposite sides edges of the light guide panels 10, if the supply of light from two sides is required. As a matter of principle, holding frames 28 will be provided in those cases in which there are no light guide battens 12. In a particular case it would also be possible to have individual edge zones without any holding frame.

The holding frames 23 and 28 may naturally be used in the other working examples of the invention, and more especially for the working example of FIG. 2. In this case the contrast panel 24 is replaced by the contrast panel 19 and the two cover panels 25 will rest on the outer side of the light guide batten 17.

In the case of the display unit shown in FIG. 6 a holding frame 23 is arranged on the upper edge of the light guide panel 10, whereas the remaining side edges are provided with holding frames 28. The light guide batten 12 in the holding frame 23 has eight LED's 15 arranged with a regular spacing therebetween. The number will be dependent on the size of the light guide panel 10, the desired intensity of illumination and on the light outputs of the individual LED's.

These LED's 15 may also be of different colors in order to produce different illuminating effects. In this case LED's turned on at the same time will produce different colors owing to the mixing of colors in the light guide batten or, respectively, in the light guide panel so that a wide variety of different colors is possible, this being more especially significant for advertising purposes. In this respect it is also possible to produce programmed sequences of light by varying the time the light sources are turned on and the brightness thereof.

In the display unit shown in FIG. 7 there are three separate holding frames 23 on the upper edge of a light guide panel 10 and these frames contain respective light guide battens and LED's 15. These three holding frames 23 are associated with three zones 30, 31 and 32 of the light guide panel 10, which are optically separated from each other. The remaining zones of the upper edge of the light guide panel 10 and of the lower edge are provided with holding frames 28. It would naturally be possible for the upper edge to be provided with a continuous holding frame 28, it being only the light guide battens which are not arranged continuously in it. The side edges of the light guide panel 10 are not provided with holding frames. In this manner it is possible for the three zones 30 to 32 to be supplied with light by the respective three LED's 15 in the holding frame 23 independently of each other, that is to say for instance in three differing colors which are sequenced in accordance with a program.

Designs in accordance with the initially mentioned prior art are naturally also possible. Thus the display unit may be connected with a supply main or line, more especially a low voltage line owing to the low electrical power required, but it is more advantageous to mount solar cells on a display unit, as for instance on the holding frame or on separate walls, which would more particularly be oblique ones. Furthermore it would be possible to include a dimming device or another electrical controller in order to automatically turn the display on and off at desired times of the day and night.

In place of cover panels for the protection of the light guide panels it would also be possible to have protective coatings on the light guide panels so that in this case a particularly compact arrangement would result, in particular in connection with the example of FIG. 2. If all the edge zones of the light guide panels are connected with each other in a sealing a manner in order to prevent condensation the intermediate space between the light guide panels may be evacuated like a sandwich structure or it may be filled with a protective gas.

What is claimed is:

1. A display unit comprising:
   a light guide panel having a front surface, a rear surface and edge surfaces;
   a display symbol arranged to be illuminated by said panel;
   a light guide batten arranged on one lateral limiting edge of said light guide panel and having a thickness in excess of a thickness of said light guide panel, said light guide batten having a groove accommodating a marginal zone of said light guide panel, to define a transition zone between said light guide batten and said light guide panel providing optical conductivity for passing light from inside said light guide batten via said side edge surface, said front surface and said rear surface of said light guide panel into said light guide panel; and
   at least one illuminating element mounted in said light guide batten.

2. A display unit in accordance with claim 1, further comprising:
   an inwardly reflecting layer, coating an external surface of said light guide batten.

3. A display unit comprising:
   an illuminating element;
   a light guide panel having a front surface, a rear surface and edge surfaces;
   a display symbol mounted on said light guide panel and arranged to be illuminated by said light guide panel; and
   a light guide batten made of light conducting material and defining a cavity enclosing said illuminating element, said light guide batten also being in optical contact with a portion of one of said rear and front surfaces of said light guide panel for passing light from said illuminating element through said light guide batten and into said light guide panel via one of said rear and front surfaces.

4. The display unit as claimed in claim 1, wherein said light guide batten is adhesively bonded to said light guide panel.

5. The display unit as claimed in claim 1, wherein said light guide batten is welded to said light guide panel.

6. The display unit as claimed in claim 1, wherein said light guide panel is retained in said groove by way of an interference fit.

7. The display unit as claimed in claim 6, wherein mutually abutting surfaces defining said interference fit are provided with a material selected from one of a group consisting of: a paste and a liquid, such material having good optical conducting properties.

8. The display unit as claimed in claim 1, wherein said light guide batten is provided with two of said grooves accommodating marginal zones of two light guide panels.

9. The display unit as claimed in claim 8, further comprising a contrast panel, and a further groove being provided in said light guide batten between said light guide panel grooves to accommodate an edge zone of said contrast panel.

10. The display unit as claimed in claim 1, comprising two light guide panels which are arranged somewhat plane-parallel to each other, a holding frame provided for such panels in the vicinity of one or two of said adjacently placed light guide battens so as to at least partly fit around said battens, and two cover panels which respectively cover said light guide panels to the outside, said cover panels being arranged somewhat plane-parallel to said guide panels and being made of transparent material.

11. The display unit as claimed in claim 10, wherein said holding frame comprises a wiring channel for power supply means for said illuminating element.

12. The display unit as claimed in claim 1, comprising two light guide panels which are arranged somewhat plane-parallel to each other, a holding frame arranged outside one of said light guide battens, said frame having grooves accommodating edge zones of said light guide panels, and a contrast panel arranged between said light guide panels.

13. The display unit as claimed in claim 12, wherein said holding frame has two further grooves, respectively placed outside the other grooves, accommodating edge zones of two cover panels.

14. The display unit as claimed in claim 13, wherein said holding frames consist of resin and have an external recess to receive a metallic reinforcing strip.

15. The display unit as claimed in claim 1, wherein said illuminating element is in a form of an LED.

16. The display unit as claimed in claim 15, comprising a plurality of such illuminating elements adapted to produce light in different colors.

17. The display unit as claimed in claim 14, wherein a plurality of light guide battens are associated with different zones of said light guide panel, said plurality of light guide battens having respectively a plurality of illuminating elements with different colors.

18. The display unit as claimed in claim 1, wherein all edge zones of said light guide panel not provided with said light batten are coated with a reflecting layer.

19. The display unit as claimed in claim 1, wherein said at least one symbol to be illuminated is bonded to, or produced by vapor coating on a surface of said light guide panel which is a rear surface in relation to a viewing position.

20. The display unit as claimed in claim 1, comprising fluorescent particles in at least one of the following: said light guide panel and said light guide batten.

* * * * *